United States Patent [19]
Gelbach et al.

[11] Patent Number: 5,272,915
[45] Date of Patent: Dec. 28, 1993

[54] AIRFLOW SENSING SYSTEM

[75] Inventors: Herman R. Gelbach, Normandy Park; Michael D. Morgan, Seattle, both of Wash.

[73] Assignee: The Boeing Company, Seattle, Wash.

[21] Appl. No.: 824,790

[22] Filed: Jan. 23, 1992

[51] Int. Cl.⁵ ............................ G01F 1/68; G01M 9/00
[52] U.S. Cl. ..................................... 73/147; 73/204.18; 73/204.26
[58] Field of Search ................ 73/147, 204.26, 204.18, 73/204.15, 204.25

[56] References Cited

U.S. PATENT DOCUMENTS

| | | | |
|---|---|---|---|
| Re. 33,076 | 10/1989 | Sugiura | 73/204.15 |
| 2,748,372 | 5/1956 | Bunds, Jr. | 340/27 |
| 2,871,698 | 2/1959 | Bagby | 73/147 |
| 3,517,556 | 6/1970 | Barker | 73/362 |
| 3,688,581 | 9/1972 | Le Quernec | 73/362 AR |
| 3,817,104 | 6/1974 | Sapir | 73/362 AR |
| 3,861,214 | 1/1975 | Siyahi | 73/362 AR |
| 3,964,306 | 6/1976 | Fletcher et al. | 73/194 R |
| 3,988,928 | 11/1976 | Edstrom et al. | 73/204 |
| 4,061,029 | 12/1977 | Fletcher | 73/180 |
| 4,106,341 | 8/1978 | Serrano | 73/362 AR |
| 4,188,823 | 2/1980 | Hood | 73/147 |
| 4,478,076 | 10/1984 | Bohrer | 73/204 |
| 4,649,387 | 3/1987 | Maris | 340/966 |
| 4,727,751 | 3/1988 | Holmes et al. | 73/147 |
| 4,774,835 | 10/1988 | Holmes et al. | 73/147 |
| 5,074,147 | 12/1991 | Sarma | 73/204.15 |

Primary Examiner—Donald O. Woodiel
Attorney, Agent, or Firm—Christensen, O'Connor, Johnson & Kindness

[57] ABSTRACT

Disclosed is an airflow sensing system for determining the type of airflow flowing over a flight surface. A hot film sensor is driven by a constant voltage feedback circuit that maintains the voltage across the sensor at a predetermined level. A signal processing circuit receives an output signal of the feedback circuit and determines whether the output signal is indicative of laminar, transitional or turbulent airflow. Transitional airflow is distinguished from turbulent airflow by a signal having significant energy in a low-frequency passband from 50–80 Hz. The signal processing circuit drives a three-color LED display to provide a visual indication of the type of airflow being sensed.

28 Claims, 3 Drawing Sheets

AIRFLOW SENSING SYSTEM

LICENSE RIGHTS

The invention described herein was made in the performance of work under NASA Contract NAS1-18574, and is subject to the provisions of Section 305 of the National Aeronautics and Space Act of 1958, as amended (42 U.S.C. § 2457).

FIELD OF THE INVENTION

The present invention relates generally to electronic airflow sensors and, in particular, to hot film sensors for determining airflow conditions on an aircraft wing.

BACKGROUND OF THE INVENTION

The study of airflow characteristics is an important part of basic aeronautical research and design. Air passing over a flight surface, such as a wing, is either laminar, transitional, or turbulent in nature. Air that flows smoothly in a continuous stream is laminar, while an air stream that is rough or broken is turbulent. Transitional airflow, as the name implies, alternates between laminar and turbulent conditions. As the airflow over an aircraft wing becomes turbulent, the fuel efficiency of the aircraft decreases. Therefore, in order to achieve maximum fuel efficiency of an aircraft, it is necessary that the airflow be laminar over as much of the wing surface as possible. Modem aircraft designers are currently experimenting with ways to alter the airflow patterns over an aircraft's wings while in flight in order to increase fuel efficiency. If these methods prove successful, pilots will be provided with controls or automated systems that alter the airflow over the wings to maintain maximum fuel efficiency in any given flight situation.

The most common way of measuring the characteristics of airflow over a wing is by using a hot film sensor as disclosed in U.S. Pat. No. 4,727,751. This method involves placing a plurality of hot film sensors at various locations on the wing and measuring the heat transfer from the sensors to the airstream as they are exposed to laminar, transitional or turbulent airflow. Such hot film sensors are coupled to an anemometer circuit, which drives them to a constant temperature with a feedback circuit such as that shown in FIG. 1 in the attached drawings or excites them with a constant current, depending on the experimenter's preference.

In the circuit shown in FIG. 1, an amplifier 10 drives a bridge network, including resistors R1, R2, R3, and R4. Resistor R4 is a hot film sensor having a resistance that varies with temperature. In operation, the feedback circuit supplies sufficient power to heat resistor R4 to a constant temperature so that the bridge network is balanced. As resistor R4 is cooled by the varying types of airflow passing over it, the feedback circuit adjusts the current supplied to reheat the resistor so that the bridge remains balanced. A capacitor 12 couples the output of the amplifier 10 to a signal measuring device, such as an oscilloscope, to determine the type of airflow flowing over the sensor. While the circuit in FIG. 1 works well for test conditions that take place at a relatively constant temperature, it has some serious limitations for determining airflow quality in varying ambient conditions.

In actual test conditions, the ambient temperature to which a wing is exposed may drop from 120° F. at sea level to −60° F. at 60,000 feet. The feedback circuit shown in FIG. 1 attempts to maintain the temperature of the hot film sensor constant, regardless of the ambient temperature of the air flowing over the wing. By requiring that the temperature of the sensor R4 be maintained at some specified level, the power-supplying capability of amplifier 10 can easily be exceeded. Furthermore, if the hot film sensor R4 is maintained at some relatively high temperature, such as 130°-150° F. for a 10°-30° temperature over ambient (overtemp) at sea level, this would result in a 190°-210° overtamp at −60° F. At these temperatures the hot film sensor will tend to heat the air flowing over it, thereby altering the characteristics of the airflow that the circuit is trying to sense as well as burning the wires that supply heat to the sensors.

Another problem with the feedback circuit of FIG. 1 is that the resistance of the leads that extend from the hot film sensor R4 to the feedback circuit located in the cabin also varies with temperature. On a large airplane wing, the lead resistance may be of the same magnitude as the sensor. Because these leads are effectively included within the bridge circuit, the output signal of amplifier 10 cannot distinguish between a change in resistance of the sensor and a change in resistance of the leads. While not theoretically a problem, most implementations of the constant temperature feedback circuit of FIG. 1 will not faithfully follow the large variations in heat transfer when the sensor is subjected to transitional airflow conditions.

Another method of sensor excitation taught by prior art is the constant current method. With this method, a constant current is caused to flow through the hot film sensor at all times. However, since the sensors normally have a positive temperature coefficient, as the sensor is heated, the resistance rises thereby requiring more power to be delivered to the sensor to maintain the level of current. The increased power in turn heats the sensor, raising its resistance which requires more power etc. If the temperature of the sensor rises enough, it may be destroyed by overheating. Conversely, as the sensor is cooled, the excitation power required to maintain the constant current decreases, further cooling the sensor, etc. Thus, the sensitivity of the sensor varies with ambient temperature.

Finally, none of the prior art methods of sensing airflow conditions provide an output signal that allows a test engineer to quickly determine the type of airflow being sensed. The output signal of the prior art methods must be coupled to an oscilloscope or some other electronic test equipment that visually displays the signal to allow an interpretation.

In order to overcome the limitations of prior art airflow sensing systems, an airflow sensing circuit is required that is capable of operating over a wide range of temperatures. Similarly, a circuit is needed that is insensitive to variations in the resistance of the lead lines that extend from the sensor to the instrumentation within the aircraft. Furthermore, a circuit is desired that will follow the large dynamic range excursions of transitional airflow conditions. Finally, a sensing system is desired that provides a test engineer with an immediate indication of the type of airflow being sensed, without the need to interpret a visual waveform representation of the sensor signal.

SUMMARY OF THE INVENTION

According to the present invention, an airflow sensing system is disclosed that comprises a series of temperature sensitive flow sensors disposed at a plurality of different positions on a flight surface. Each flow sensor has a response characteristic that varies when exposed to laminar, transitional, or turbulent airflow. A plurality of feedback circuits are each coupled to a different one of the flow sensors to maintain a constant voltage across the flow sensor and to produce an output signal that is proportional to a change in the response characteristic of the flow sensor. A plurality of signal processing circuits are coupled to receive the output signals from the plurality of feedback circuits and include a decision-making circuit for determining whether the output signal is indicative of laminar, transitional, or turbulent airflow across the flight surface. A display includes a pictorial representation of the wing with the flow condition at each sensor location being indicated by a different color. The display preferably includes a plurality of light-emitting diodes that emit red, green, or amber light as a function of the type of airflow flowing over the flow sensors.

DETAILED DESCRIPTION OF THE PREFERRED EMBODIMENT

Figure 1:
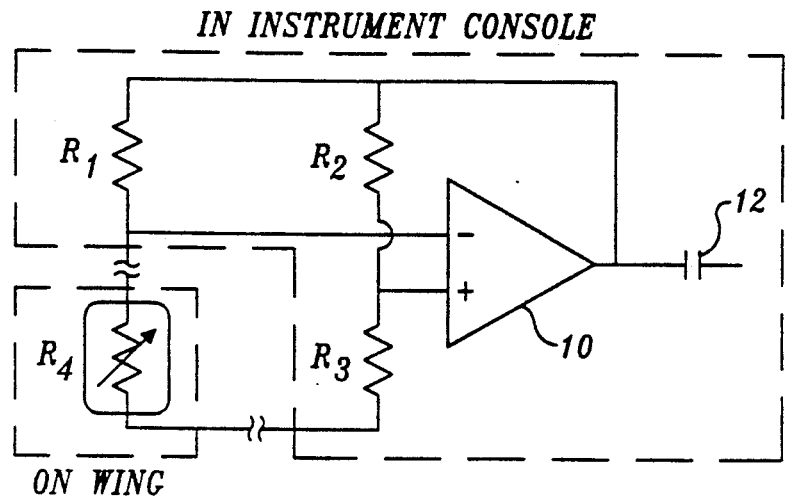
FIG. 1 is a constant temperature hot film airflow sensing circuit according to the prior art.
Figure 2:
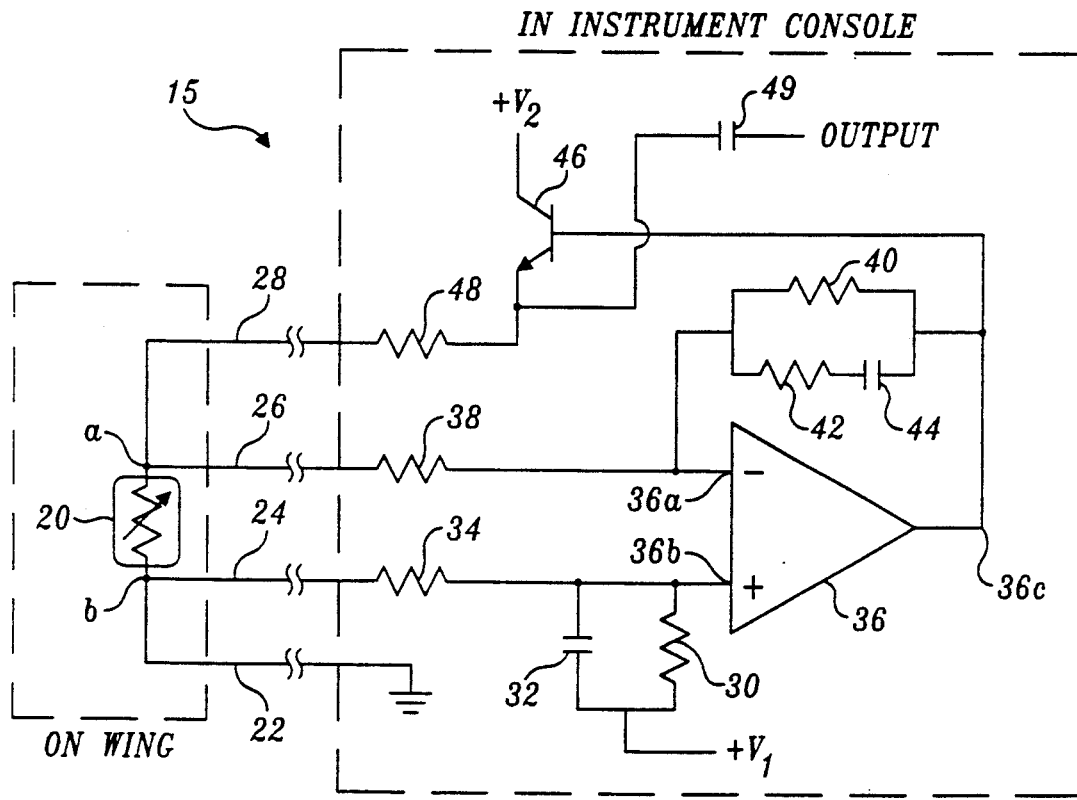
FIG. 2 is an airflow sensing circuit according to the present invention.

FIG. 2 is a schematic diagram of an airflow sensing circuit 15 according to the present invention. A flow sensor 20 is disposed on a flight surface, such as an aircraft wing (not shown), to detect the type of airflow (i.e., laminar, transitional, or turbulent) over the flight surface. Preferably, the airflow sensor 20 is a hot film-type sensor having a resistance that varies with temperature. As the sensor 20 is exposed to various types of airflow, its resistance varies, thereby providing a signal indicative of the type of airflow over it. Sensor 20 is connected to four leads 22, 24, 26, and 28, which couple the sensor to a feedback circuit 15 disposed within the aircraft, some distance away from the sensor 20. Lead 28 supplies electric current to sensor 20, while lead 22 is a return path to ground. Leads 22 and 24 are connected to sensor 20 at a node "b" while leads 26 and 28 are connected to sensor 20 at a node "a". The voltage at node b is slightly above ground potential and depends upon the resistance of lead 22 and the level of current flowing through sensor 20.

A filtered voltage divider comprising a resistor 30, a capacitor 32, and a resistor 34 is connected between a fixed voltage supply $V_1$ and node b. The voltage divider provides a fixed voltage to a noninverting terminal 36b of an operational amplifier 36. Connected between an inverting terminal 36a of operational amplifier 36 and node a is a resistor 38. Extending between the inverting terminal 36a and an output terminal 36c in a feedback loop are a resistor 40, a resistor 42, and a capacitor 44 that determine the gain of the operational amplifier and attenuate any high-frequency signals picked up by leads 24 and 26. The output signal of operational amplifier 36 is connected to the base of a transistor 46, thereby controlling current through a resistor 48 and the sensor 20. The collector of transistor 46 is connected to a source of potential $V_2$, and the emitter is connected to resistor 48. Operational amplifier 36 drives transistor 46 until the voltage at node a is equal to the voltage of the noninverting terminal 36b. Although the feedback circuit 15 is shown including an operational amplifier 36, those skilled in the art will recognize that discrete components such as matched transistors could be substituted for the operational amplifier.

As the flow sensor 20 is subjected to various laminar, transitional, and turbulent airflow conditions, its resistance changes, thereby causing a corresponding change of voltage at node a. The operational amplifier responds by causing transistor 46 to increase or decrease the level of current through sensor 20 and resistor 48 so as to maintain the voltage at node a at a level equal to the voltage at the noninverting terminal 36b. Because the resistance of the flow sensor 20 typically does not vary by more than about +30% during a flight, the power-supplying capabilities of amplifier 36 are not exceeded in supplying the current through transistor 46 required to meet this condition.

A DC blocking capacitor 49 is connected at the junction of resistor 48 and the emitter of transistor 46 to provide an output signal indicative of the type of airflow over sensor 20 caused by the varying voltage drop across resistor 48 due to the current changes required to maintain the constant voltage across the sensor 20. Although the flow sensor 20 requires more DC current to maintain the desired voltage across it as it is exposed to cooler ambient temperatures, it is only the AC portion of the output signal that is indicative of changing airflow conditions. Therefore, the feedback circuit of FIG. 2 is able to sense airflow conditions despite changes in ambient air temperature. However those skilled in the art will realize that the capacitor 49 need not be used if a test engineer is interested in determining the magnitude of the airflow over sensor 20. In the preferred embodiment, the resistance of resistors 34 and 38 is much greater than the respective resistance of leads 24 and 26 to ensure that any voltage drop along these leads does not affect the operation of the circuit. Because the level of current flowing in the leads 24 and 26 is small, the feedback circuit 15 is only sensitive to a change in resistance of flow sensor 20 caused by variations in airflow.

Figure 3:
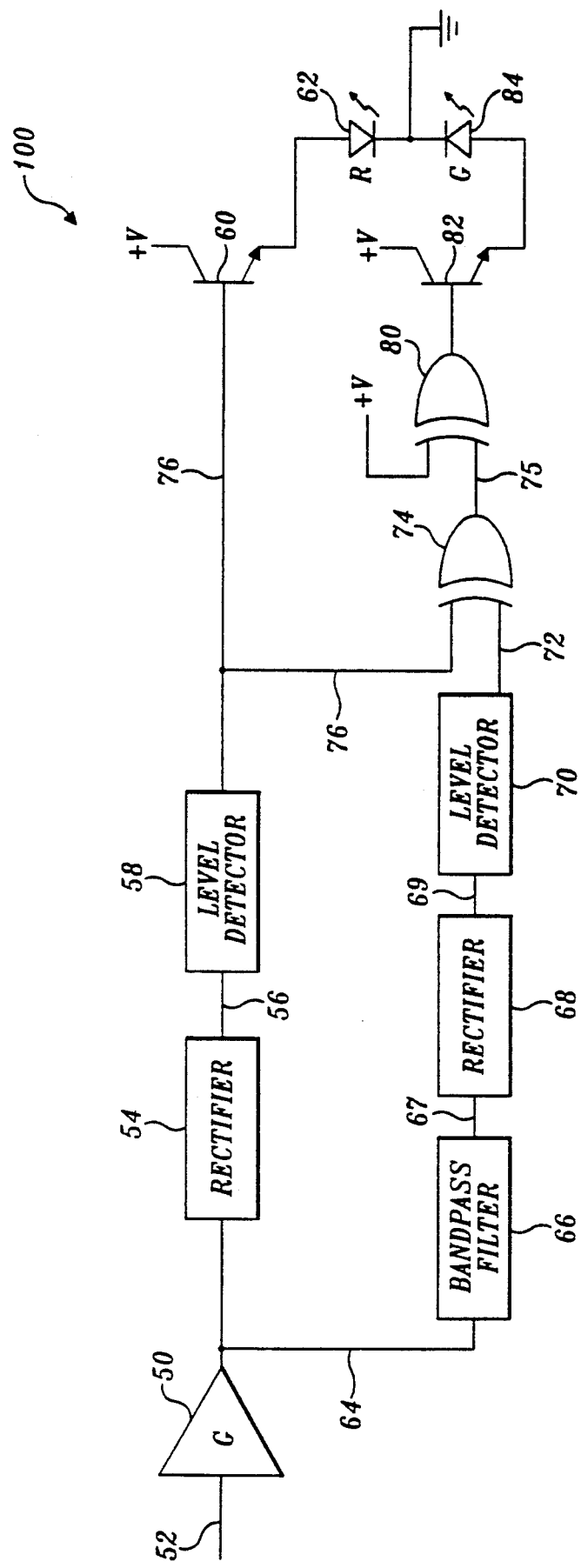
FIG. 3 is a block diagram of a signal processing circuit according to the present invention.

FIG. 3 shows a block diagram of a signal processing circuit 100 according to the present invention. An amplifier 50 is provided for each signal processing circuit, but has a gain control common to all of the signal processing circuits so that an operator need only change one gain control setting in order to affect all the signal processing circuits equally. The amplifier 50 receives the output signal on a lead 52 from the capacitor 49 of feedback circuit 15 shown in FIG. 2. The output of amplifier 50 is rectified by a rectifier 54 and the resulting signal is connected to a level detector 58 by a lead 56. If the level of the signal on lead 56 is greater than a first predetermined threshold, the level detector 56 applies a signal on a lead 76 that turns on a transistor 60, which in turn supplies current from a voltage source +V to light a light-emitting diode (LED) 62 thereby indicating to the operator that the airflow over sensor 20 is turbulent.

Also connected to the output of amplifier 50 by a lead 64 is a bandpass filter 66. In the preferred embodiment, bandpass filter 66 has a passband of 50-80 Hz. The output of bandpass filter 66 is connected by a lead 67 to a second rectifier 68. The output of rectifier 68 is connected by a lead 69 to a second level detector 70. Level detector 70 compares the level of the signal on lead 69 with a second predetermined threshold. If the level of the signal on lead 69 is greater than the second predetermined threshold, the level detector 70 applies a logic high signal (i.e., a digital binary "one") on a lead 72 signal to an "exclusive OR" (XOR) gate 74. Also connected to a pin input of XOR gate 74 on the lead 76 is output signal of level detector 58. An output lead 75 of XOR gate 74 carries a logic high signal if the signal on only one of leads 76 or 72 is a logic high. However, if the signal on leads 72 and 76 have the same logic level, i.e., both logic high or both logic low, then the output of XOR gate 74 is logic low. Connected to the output lead 75 of XOR gate 74 is one input of a second XOR gate 80. A second input pin of XOR gate 80 is tied to a logic high level. If the output of XOR gate 80 is logic high (which occurs only when the output of XOR gate 74 is logic low), a second transistor 82 is turned on, providing current to turn on a green LED 84, indicating laminar airflow over sensor 20.

The signal processing circuit of FIG. 3 lights the green LED 84 if the signal on lead 64 is less than both the first and second predetermined thresholds. Such a signal is indicative of laminar airflow. Turbulent airflow is detected when the signal has a large amplitude, i.e., larger than the first predetermined threshold, but relatively little energy in the frequency range of 50–80 Hz, so that the signal processing circuit 100 lights the red LED 62. Transitional airflow is characterized by a large amplitude output signal, including substantial energy in the frequency range of 50–80 Hz. Therefore, if the output of the bandpass filter 66 exceeds the magnitude of the second predetermined threshold, both the green and red LEDs 84 and 62 are energized, producing an amber light. Thus, signal processing circuit 100 shown in FIG. 3 enables an operator to quickly identify the type of airflow over each sensor, based on the color of light emitted by the LEDs associated with each sensor. Although the signal processing circuit according to the present invention is shown comprised of analog components, those skilled in the art will realize that the functions performed by the analog components could be performed with a microprocessor suitably programmed.

Figure 4:
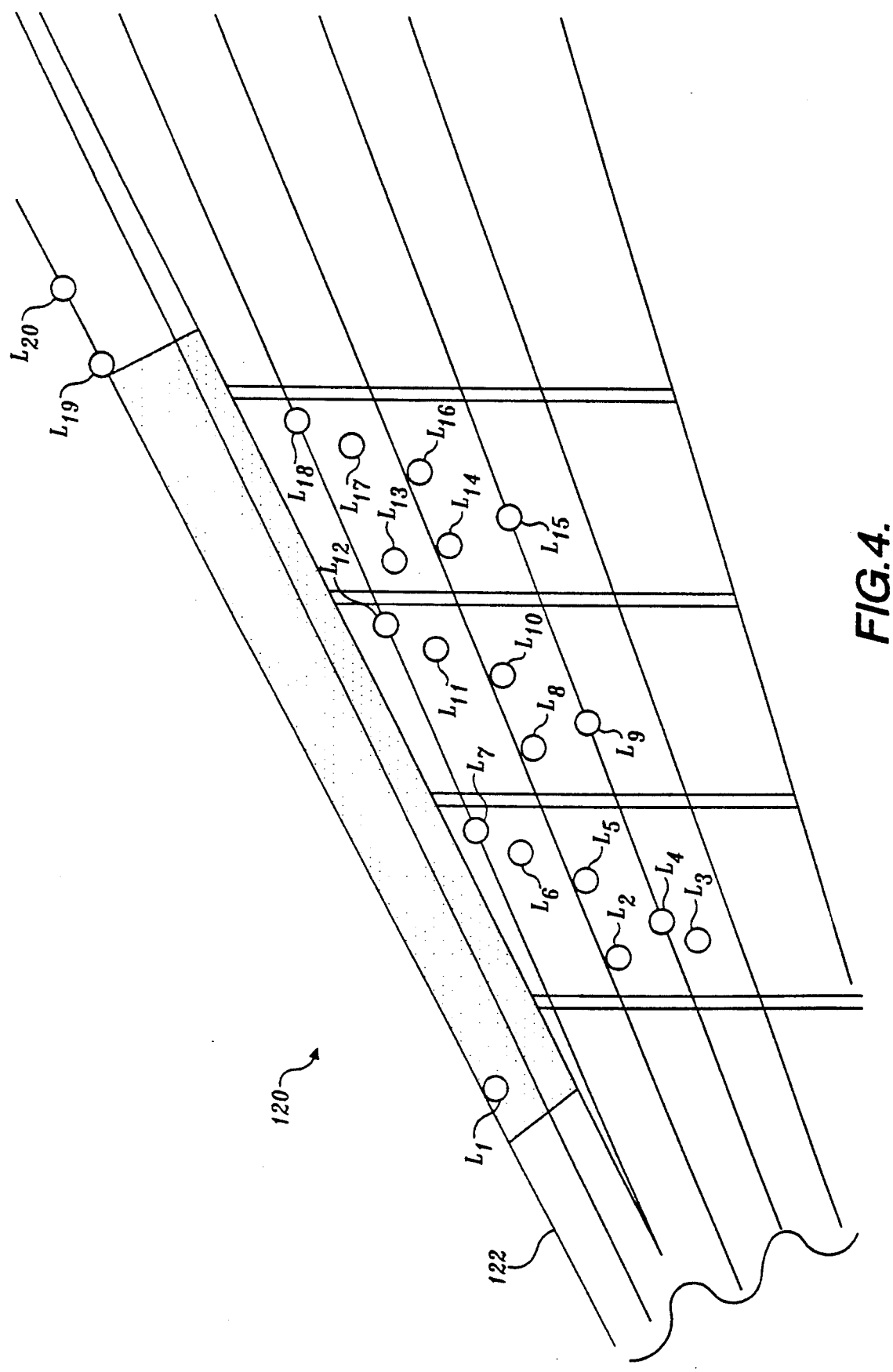
FIG. 4 is a schematic diagram of an airflow display according to the present invention.

FIG. 4 shows a schematic diagram of an airflow display panel 120 according to the present invention. The display includes a plurality of three-color LEDs $L_1$–$L_{20}$ capable of displaying red, green, or amber light; each LED is disposed on a graphic representation 122 of a flight surface, e.g., a wing, at the same relative position as an associated flow sensor. Each of the LEDs is driven by a signal processing circuit 100, as shown in FIG. 3. Therefore, by simply looking at the display, the operator can determine the type of airflow over the sensor: green for laminar airflow; red for turbulent airflow; and amber for transitional airflow. The display 120 of FIG. 4 alleviates the need to monitor a different oscilloscope trace for each flow sensor in order to determine the type of airflow flowing over the flight surface.

While the preferred embodiment of the invention has been illustrated and described, it will be appreciated that various changes can be made therein without departing from the spirit and scope of the invention. Therefore, it is intended that the scope be determined solely from the following claims.

The embodiments of the invention in which an exclusive property or privilege is claimed are defined as follows:

1. A system for measuring the airflow characteristics over a flight surface, comprising:
   a plurality of flow sensors disposed at a plurality of different positions on the flight surface, said flow sensors having a response characteristic that varies when the flow sensors are exposed to different types of airflow, including laminar, transitional, and turbulent airflow;
   a plurality of feedback circuits, each of which is coupled to a different one of the flow sensors, each of said feedback circuits maintaining a constant voltage across the flow sensor to which the feedback circuit is coupled and producing an output signal that is indicative of a change in the response characteristic of said flow sensor to airflow over it and thus indicative of the type of airflow over the flow sensor;
   a plurality of signal processing circuits, each of which receives the output signal from a different one of the feedback circuits, each signal processing circuit including means for processing the output signal to determine whether the airflow over the flow sensor to which the signal processing circuit is coupled is laminar, transitional, or turbulent.

2. The system as in claim 1, wherein the signal processing circuits include means for driving a display to indicate the type of airflow over each of the flow sensors.

3. The system as in claim 1, wherein each of the signal processing circuits comprises:
   means for comparing the output signal of one of the feedback circuits with a first predetermined threshold and for producing an indication of laminar airflow if the output signal has a magnitude less than the magnitude of the first predetermined threshold.

4. The system as in claim 3, wherein each of the signal processing circuits further comprises:
   a filter circuit for filtering the output signal of one of the feedback circuits to produce a filtered signal having a magnitude proportional to the amount of energy the output signal has in a predefined range of frequencies;
   means for comparing the filtered signal with a second predetermined threshold and for producing an indication of transitional airflow if the magnitude of the filtered signal is greater than the second predetermined threshold.

5. The system as in claim 4, wherein each signal processing circuit further comprises:
   means for producing an indication of turbulent airflow if the output signal of one of the feedback circuits has a magnitude greater than the first predetermined threshold, but the filtered signal does not have a magnitude greater than the second predetermined threshold.

6. The system of claim 5, wherein the indications of laminar, transitional, or turbulent airflow over the airflow sensors comprise:
   light emitted by a plurality of light-emitting diodes (LEDS) wherein the color of the light emitted is a function of the type of airflow.

7. The system as in claim 6, wherein the plurality of LEDs are disposed on a graphical representation of the flight surface at locations corresponding to the positions of the flow sensors on the flight surface.

8. The system as in claim 6, wherein the plurality of LEDs are driven by the signal processing circuits to display green light if the airflow is laminar, amber light if the airflow is transitional, and red light if the airflow is turbulent.

9. The system as in claim 4, wherein the filter circuit passes frequencies in the range of 5 to 100 Hz.

10. The system of claim 1, wherein each feedback circuit comprises:
an amplifier circuit having a first input terminal, a second input terminal, and an output terminal that generates a feedback circuit output signal, which is proportional to a difference between the voltage on the first and second input terminals;
wherein the first input terminal is coupled to a reference voltage source, and the second input terminal is coupled to the flow sensor.

11. The system as in claim 10, wherein each feedback circuit further comprises:
a transistor coupled to the amplifier circuit to control an amount of current delivered to the flow sensor in proportion to the feedback circuit output signal.

12. The system as in claim 1, wherein each flow sensor comprises a hot film sensor having a resistance that varies with temperature.

13. An electronic sensor circuit for sensing airflow conditions over an exterior surface of an aircraft, comprising:
a source of a reference voltage;
a flow sensor disposed on an exterior surface of the aircraft, said flow sensor having a resistance that varies with temperature and mounted so as to be exposed to airflow over the exterior surface of the aircraft, said flow sensor being connected in series with first and second leads that deliver current to the sensor, said flow sensor further including third and fourth leads coupled to the ends of the flow sensor to measure the voltage across the flow sensor;
feedback means for maintaining a voltage signal across the flow sensor at a level substantially equal to the reference voltage and generating an output signal that is indicate of the airflow conditions over the exterior surface of the aircraft at the flow sensor, said feedback means including an amplifier circuit having a first input terminal, a second input terminal, and an output terminal whereat the output signal is generated, said first input terminal being coupled to both the reference voltage source and the third lead and the second input being coupled to the fourth lead.

14. The electronic sensor circuit as in claim 13, wherein the feedback means further comprises:
a transistor having a base terminal that is coupled to the output terminal of the amplifier circuit to control an amount of current delivered through the first and second leads to the flow sensor in proportion to the output signal of the feedback means.

15. The electronic sensor circuit as in claim 13, further comprising:
a signal processing circuit connected to receive the output signal of the feedback means, wherein the signal processing circuit determines a type of airflow over the exterior surface of the aircraft and includes:

a first comparator circuit for comparing the output signal with a first predetermined threshold whereby, if the output signal of the feedback means has a magnitude greater than the first predetermined threshold, the signal processing circuit generates a signal indicative of a turbulent airflow.

16. The electronic circuit of claim 15, wherein the signal processing circuit further comprises:
a filter, connected to filter the output signal of the feedback means, producing a filtered output signal;
a second comparator circuit for comparing the filtered output signal with a second predetermined threshold whereby, if the magnitude of the output signal of the feedback means is greater than the first predetermined threshold and if the magnitude of the filtered output signal is greater than the second predetermined threshold, then the signal processing circuit generates a signal indicative of a transitional airflow.

17. The electronic circuit as in claim 15, wherein the signal processing circuit includes means for generating a signal indicative of laminar airflow if the magnitude of the output signal of the feedback means is less than the first predetermined threshold.

18. The electronic circuit as in claim 17, further comprising:
a display unit coupled to receive the signals indicative of laminar, transitional or turbulent airflow, the display unit providing a visual indication of the airflow over the exterior surface of the aircraft.

19. The electronic circuit as in claim 18, wherein the display unit comprises:
a plurality of light-emitting diodes (LEDS) that emit light of a color that is a function of the signals indicative of laminar, transitional, and turbulent airflow.

20. A method of sensing airflow conditions on a flight surface, comprising the steps of:
placing a plurality of airflow sensors on the flight surface, the airflow sensors having a resistance that varies with temperature;
producing a feedback signal for each of the plurality of airflow sensors that maintains a constant voltage across each of said airflow sensors as the sensors are exposed to laminar, transitional, and turbulent airflow;
analyzing each feedback signal to determine if the type of airflow is laminar, transitional, or turbulent.

21. The method of claim 20, wherein the step of analyzing each feedback signal comprises the steps of:
removing a DC component of the feedback signal, leaving an AC component of the feedback signal;
comparing the magnitude of the AC component of the feedback signal with a first predetermined threshold; and
producing an indication of laminar airflow if the magnitude of the AC component is less than the first predetermined threshold.

22. The method of claim 21, further comprising the steps of:
filtering the AC component of the feedback signal to produce a filtered feedback signal;
comparing the magnitude of the filtered feedback signal with a second predetermined threshold; and
producing an indication of transitional airflow if the magnitude of the filtered feedback signal is greater than the second predetermined threshold.

23. The method of claim 22, further comprising the step of:

producing an indication of turbulent airflow if the magnitude of the AC component of the feedback signal is greater than the first predetermined threshold and the magnitude of the filtered feedback signal is less than the second predetermined threshold.

24. The method of claim 23, further comprising the step of:

providing a visual indication of laminar, transitional or turbulent airflow conditions on the flight surface.

25. A method of determining an airflow condition over a hot film type sensor that is disposed on an exterior of an aircraft, comprising the steps of:

supplying the hot film sensor with a variable current such that a substantially constant voltage is produced across the hot film sensor, sensing the variable current to produce a current signal indicative of the variable current;

filtering the current signal to determine an AC component of the variable current;

comparing the magnitude of the AC component of the variable current with a first predetermined threshold; and producing an indication of laminar airflow if the magnitude of the AC component of the variable current is less than the first predetermined threshold.

26. The method of claim 25, further comprising the steps of:

filtering the AC component of the variable current; and comparing the magnitude of the filtered AC component of the variable current with a second predetermined threshold; and producing an indication of transitional airflow if the magnitude of the filtered AC component of the variable current is greater than the second predetermined threshold.

27. The method of claim 26, further comprising the step of:

producing an indication of turbulent airflow if the magnitude of the AC component of the variable current is greater than the first predetermined threshold and the magnitude of the filtered AC component of the variable current is less than the second predetermined threshold.

28. The method of claim 26, wherein the step of filtering the AC component of the variable current produces a filtered signal having frequency components in the range from approximately 10 to 100 Hz.

* * * * *